United States Patent
Koehler et al.

(10) Patent No.: US 6,318,496 B1
(45) Date of Patent: Nov. 20, 2001

(54) STEERING BOOSTER SYSTEM FOR A MOTOR VEHICLE

(75) Inventors: Karl-Hans Koehler, Wernau; Michael Peetz, Wuelfrath; Albrecht Pluschke, Winnenden; Gerd Speidel, Winterbach, all of (DE)

(73) Assignee: Mercedes-Benz Lenkungen GmbH, Duesseldorf (DE)

( * ) Notice: Subject to any disclaimer, the term of this patent is extended or adjusted under 35 U.S.C. 154(b) by 0 days.

(21) Appl. No.: 09/166,149

(22) Filed: Oct. 5, 1998

(30) Foreign Application Priority Data

Oct. 4, 1997 (DE) ............................................. 197 43 961

(51) Int. Cl.$^7$ ........................................................ B62D 5/04
(52) U.S. Cl. ..................... 180/444; 192/48.9; 310/105; 74/388 PS; 74/664
(58) Field of Search ..................... 180/443, 444; 192/48.9, 84.2; 310/105; 74/388 PS, 664

(56) References Cited

U.S. PATENT DOCUMENTS

| | | | |
|---|---|---|---|
| 4,416,345 | * 11/1983 | Barthelemy | 74/388 PS |
| 4,685,861 | * 8/1987 | Huetsch | 414/729 |
| 4,726,437 | * 2/1988 | Norton | 180/79.1 |
| 5,450,916 | * 9/1995 | Budaker et al. | 180/79.1 |
| 5,732,791 | * 3/1998 | Pinkos et al. | 180/444 |
| 5,927,428 | * 7/1999 | Nagao et al. | 180/444 |
| 5,941,339 | * 8/1999 | Shimuzi et al. | 180/444 |

FOREIGN PATENT DOCUMENTS

| | | |
|---|---|---|
| 0 776 813 A1 | 6/1997 | (EP) . |
| 2 683 645 | 5/1993 | (FR) . |
| 61-275059 | 12/1986 | (JP) . |

* cited by examiner

Primary Examiner—Brian L. Johnson
Assistant Examiner—Avraham H. Lerner
(74) Attorney, Agent, or Firm—Crowell & Moring LLP

(57) ABSTRACT

A steering booster system for a motor vehicle has an electronic control unit which senses by way of force or torque sensors the amount and direction of forces and torques applied to a manual steering wheel and correspondingly controls, via a transmission arrangement, the steering-force-assisting connection of an electric motor into a steering gear line coupling the manual steering wheel and the steered vehicle wheels. The manufacture of the system is simplified and the controllability of the force transmission between the electric motor and the steering gear line is improved by providing that the transmission arrangement has an electrically switchable clutch for each steering direction, i.e., left or right. The two clutches are arranged such that, when the rotating direction is the same at the input of the transmission arrangement assigned to the electric motor, they in each case cause another rotating direction at the output of the transmission arrangement assigned to the steering gear line. The electronic control unit controls the amount of the steering force assistance by way of the slip of the respective clutch and/or by way of the torque of the electric motor.

6 Claims, 4 Drawing Sheets

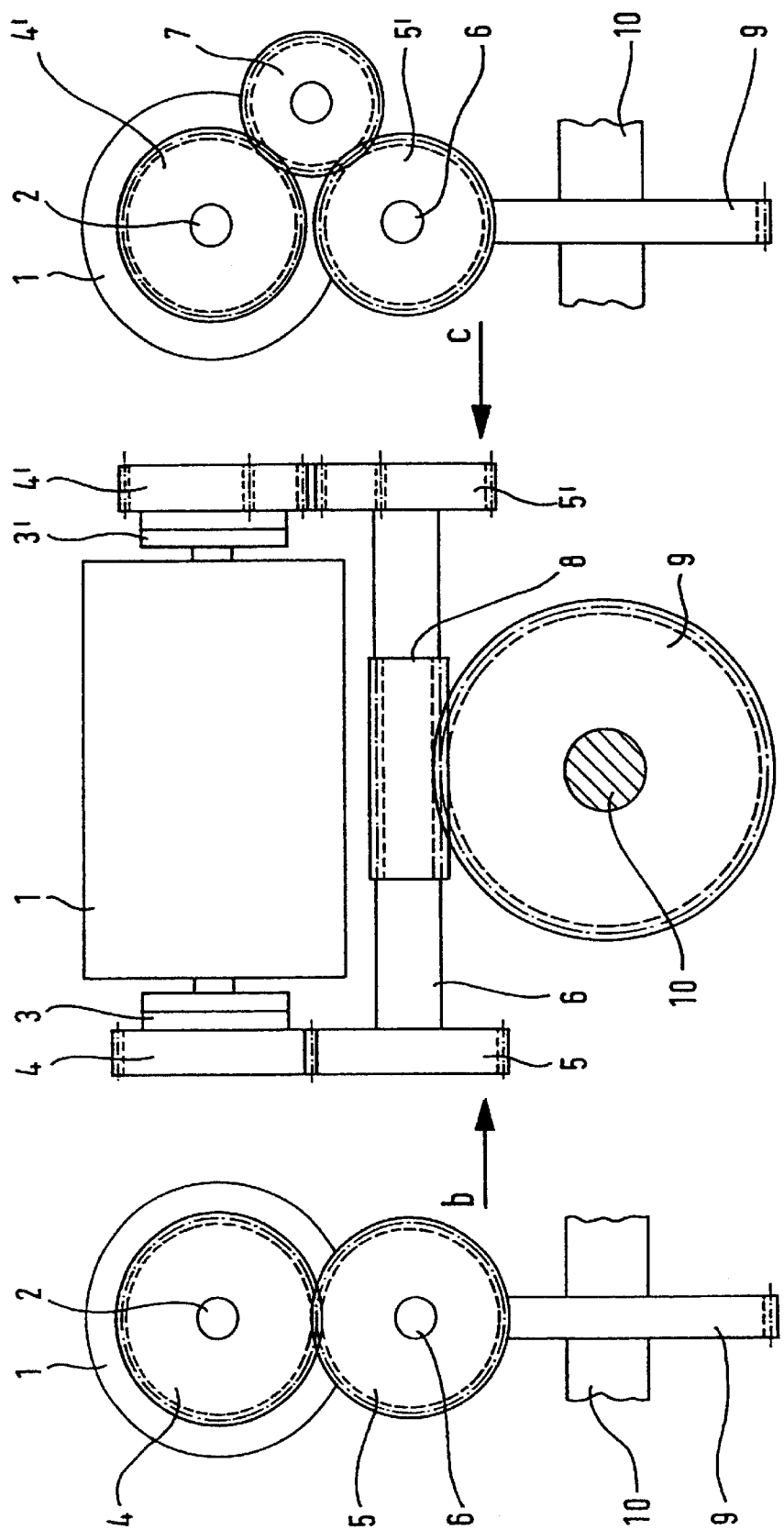

STEERING BOOSTER SYSTEM FOR A MOTOR VEHICLE

BACKGROUND OF THE INVENTION

The present invention relates to a steering booster system for a motor vehicle, and more particularly, to a system in which an electronic control unit senses, via force or torque sensors, the amount and direction of forces and torques applied by a driver to a manual steering wheel and correspondingly controls, via a transmission arrangement, the steering-force-assisting connection of an electric motor into a steering gear line coupling the manual steering wheel and the steered vehicle wheels. The transmission arrangement has an electrically switchable clutch for each steering direction (left or right) are arranged such that, in the event of the same rotation direction at the input of the transmission arrangement assigned to the electric motor, they cause a different rotation direction at the output of the transmission arrangement assigned to the steering gear line. The electronic control system controls the amount of the steering force assistance by way of the slip of the respective clutch and/or by way of the torque of the electric motor.

In a known steering booster system, which normally is also called a power steering system, the manual steering force exercised by the driver on the manual steering wheel is detected by corresponding sensors and is analyzed in an electronic control unit. As a function of the manual force applied by the driver, the control unit will then determine the required steering force assistance and correspondingly control the electric motor of this power steering system.

SUMMARY OF THE INVENTION

The present invention addresses and solves the problem of providing a particularly advantageous embodiment for such a steering booster system at lower manufacturing expenditures while maintaining good control characteristics.

According to the present invention, this problem has been solved by a steering booster system in which a transmission system contains a worm drive associated with two electrically switchable or controllable clutches.

The present invention is based on the general recognition of the desirability causing the force transmission between the electric motor used as the power drive and the steering gear line to be boosted by the power drive, by the two electrically switchable or controllable clutches. The clutches are arranged with respect to a transmission arrangement between the electric motor and the steering gear line such that, while the rotation direction of the electric motor remains the same, by way of one clutch, a steering force boosting can be caused to the left and, by way of the other clutch, a steering force boosting can be caused to the right. In order to obtain a defined amount of steering force boosting, the control unit controls the slip existing between the clutch input and the clutch output and/or the torque applied by the electric motor. This approach permits the apportioning of the steering force boosting to be correlated particularly precisely with the manual steering force applied by the driver and can be adjusted particularly precisely.

Furthermore, the steering booster system according to the present invention permits the adjustment of different dependencies between the manual steering force applied by the driver and the steering booster force applied by the electric motor by way of the respective clutch and the transmission arrangement. As a result, the characteristic curve of the steering booster system can be individually adapted to the respective vehicle and/or to the requirements of the respective driver. For example, the power steering for a heavy sedan can be preadjusted to be particularly smooth and the power steering for a vehicle with sporty ambitions can be preadjusted to be comparatively stiff. In addition, the steering force boosting can be made dependent on the respective driving situation, particularly on the driving speed, so that, for example, for parking maneuvers, a particularly high steering force boosting is available and, when driving on a turnpike, a comparatively smaller steering force boosting is available. In addition, the steering booster system according to the present invention can be constructed such that it is simultaneously used as a steering damper system, in which case the extent of the damping can be preset because of the electronic control.

A particularly advantageous embodiment of the steering booster system according to the present invention is characterized in that a rotor of the electric motor is non-rotatably connected with a first gear wheel which is in an operative engagement with a second gear wheel. The first and the second gear wheel each interact by way of one of the clutches with one shaft respectively, which each carry a worm pinion, which are in operative engagement with the worm gear of the worm drive coupled with a steering gear line. The inventive measures have the result that, during the clutch operations, only very low moments of inertia must be overcome so that the used clutches may have relatively small dimensions. In addition, the steering booster system can respond rapidly and operate with low wear.

In another relatively advantageous embodiment of the steering booster system according to the invention, eddy current clutches can be used as clutches. Such a clutch has no physical connection between the clutch input and the clutch output because the force transmission takes place by way of electromagnetic forces. As a result, such a clutch causes no mechanical friction and therefore no wear. In addition, such a clutch operates very smoothly because, on a regular basis, no vibrations can be transmitted. Other electrically shifted clutches which are suitable for use in the steering booster system according to the invention may, for example, be induction couplings or synchronous couplings, magnetic coil couplings and multiple disk clutches.

Corresponding to an expedient further aspect of the steering booster system according to the present invention, the force sensors or torque sensors can be constructed as eddy current measured value generators. Such an eddy current measured value generator is distinguished by a compact construction and has a low sensitivity to lateral forces. In addition, there is no mechanical wear at the measured value generator. Furthermore, such an eddy current measured value generator is easy to mount and is fully operable in a large temperature range. Other sensors which can be used as force or torque sensors are: inductive path sensors, photodiode sensors, ultrasonic sensors, light wave sensors, inductive angle generators, incremental path measuring systems, digital-absolute path measuring systems, laser interferometers, piezo sensors and wire strain gauges.

Other special embodiments of the steering booster system according to the present invention such that basic differences exist between embodiments with a worm drive and those without a worm drive. While the embodiments with the worm drive have a certain self-locking, which may essentially act as a steering damping, the embodiments without a worm drive have a significantly lower self-locking, whereby, for example, the steering action can be improved in the event of a failure of the power assistance. In addition, the special embodiments differ mainly because of different assembly dimensions so that the variants are selected mainly on the basis of the spatial conditions existing at the respective vehicle.

BRIEF DESCRIPTION OF THE DRAWINGS

These and further objects, features and advantages of the present invention will become more apparent from the following detailed description of a currently preferred embodiments when taken in conjunction with the accompanying drawings wherein:

FIG. 1 shows a schematic top view (A) and two side views (B, C) of a steering booster system according to the present invention in the area of the force transmission to the steering gear line, with view (B) being in the direction of arrow b in view (A) and view (C) being in the direction of arrow c in view (A);

DETAILED DESCRIPTION OF THE DRAWINGS

Figure 2B:
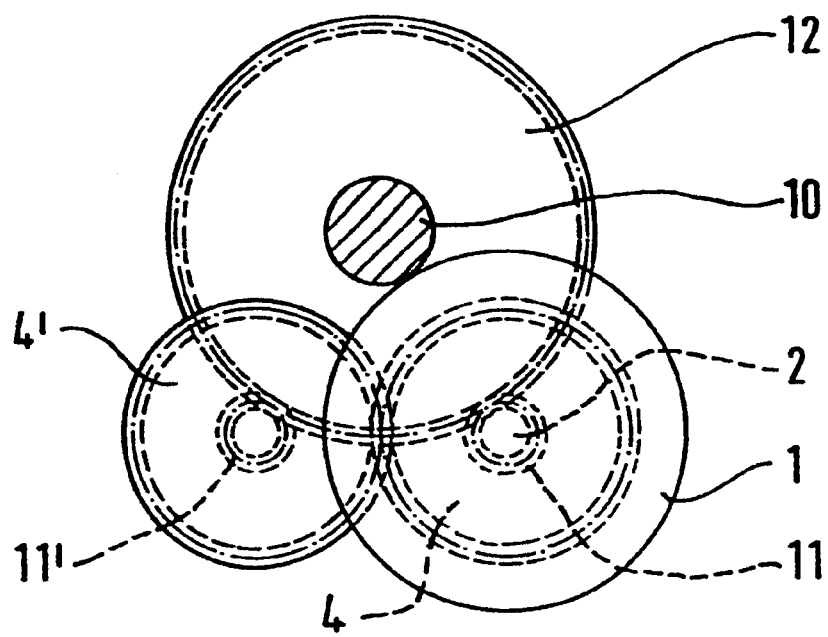
FIG. 2 is a schematic top view (A) and a schematic side view (B) of another embodiment of the steering booster system according to the invention in the area of the force transmission to the steering gear line.

In FIG. 1, a steering booster system according to the invention has an electric motor 1. On the face-side end areas of a shaft of a rotor 2, which extends coaxially through the electric motor 1 and is not visible in view (A) of FIG. 1, one clutch 3, 3' respectively is arranged on the two sides of the electric motor 1. Furthermore, one spur gear 4, 4' respectively is expediently disposed in a rotatable manner on the face-side ends of the rotor 2. The input of each clutch 3, 3' is non-rotatably connected with the rotor 2 and the output of each clutch 3, 3' is non-rotatably connected with the respectively assigned spur gear 4, 4'.

The spur gear 4, which corresponding to view (A) in FIG. 1 is arranged on the left on the electric motor 1, corresponding to view (B) of FIG. 1, is in a direct operative engagement with another spur gear 5 which is non-rotatably mounted on an axial end of a shaft 6. The spur gear 4', which corresponding to view (A) of FIG. 1 is arranged on the right side of the electric motor 1, corresponding to view (C) of FIG. 1, is in an operative engagement with an intermediate spur gear 7 which, in turn, is in an operative engagement with a spur gear 5' which, in turn, is non-rotatably mounted on the other axial end of the shaft 6.

Between its axial ends, the shaft 6 carries a worm pinion 8 in a non-rotatable manner which meshes by way of a worm gear 9. This worm gear 9 is non-rotatably connected, for example, with a pinion shaft 10 of a rack, which each form components of a manual steering wheel and of the gearing gear line coupling the steered vehicle wheels.

The steering booster system according to the invention operates generally as follows. When the driver exercises a manual force on the manual steering wheel, this manual force is mechanically transmitted to the pinion shaft 10 of the steering gear line. For example, in the area of the pinion shaft 10, conventional force or torque sensors are arranged for sensing the force applied by the driver, and a signal correlated thereto is transmitted to a conventional electronic control. This control unit analyzes the detected signals and, as a function of preselected parameters or characteristic curves, generates corresponding switching signals or switching currents which, according to the left or right angle at the manual steering wheel, act upon one or the other clutch 3 or 3'. In addition, it may be provided that the control unit influences the torque of the electric motor 1.

So that the steering booster system according to the present invention can rapidly provide an appropriate steering force assistance, the electric motor 1 or its rotor 2 continuously rotate along at a defined rotational idling speed, as soon as the motor vehicle has been started. When the clutch 3, which corresponding to view (A) in FIG. 1 is on the left, is activated, by way of the spur gear 5, the spur gear 4 drives the shaft 6 in one direction, while, in the case of an activation of the clutch 3' which is on the right corresponding to view (A) in FIG. 1, by way of the intermediate spur gear 7 and the spur gear 5', the spur gear 4' drives the shaft 6 in the opposite direction. Correspondingly, the worm pinion 8 will then cause a left or right rotation of the worm gear 9 and thus of the pinion shaft 10.

The control of the steering booster forces transmitted to the steering gear line takes place by way of the slip existing at the respective clutch 3 or 3' and/or the torque applied by the electric motor, in which case the slip as well as the torque can be controlled by the control unit as a function of defined characteristic curves.

The worm gear provides a certain self-locking of the steering gear line which is essentially a function of the geometry of the selected toothing between the worm pinion 8 and the worm gear 9. Such a self-locking may be desirable if it operates as a steering damping.

Figure 2A:
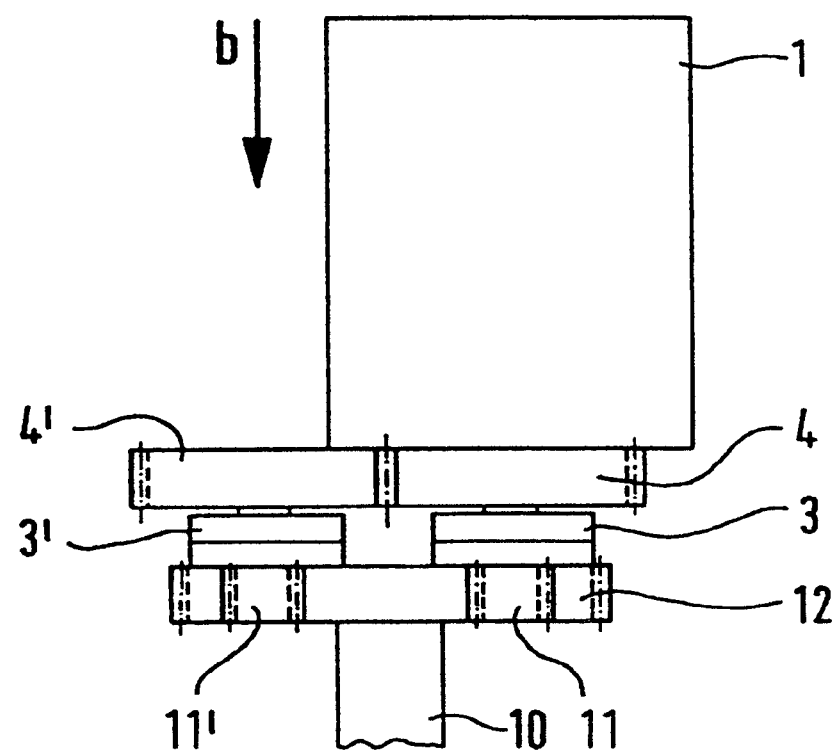

In another embodiment corresponding to views (A) and (B) of FIG. 2, a spur gear 4 and a clutch 3 are again arranged on an axial end of the rotor 2 of the electric motor 1. However, in this embodiment, the spur gear 4 is non-rotatably connected with the rotor 2. The input side of the clutch 3 is non-rotatably connected either with the spur gear 4 or with the rotor 2, or with the spur gear 4 as well as with the rotor 2. The output side of the clutch 3 is non-rotatably connected with another spur gear 11 which is in an operative engagement with a spur gear 12 which, in turn, is non-rotatably connected with the pinion shaft 10 of the steering gear line. By way of the clutch 3, the spur gear 11 and the spur gear 12, the pinion shaft 10 of the steering gear line can be driven in one rotating direction. For the other rotating direction, the spur gear 4 is in an operative engagement with a spur gear 4' which is non-rotatably connected with the input side of the second clutch 3'. The output side of this clutch 3', in turn, is non-rotatably connected with a corresponding spur gear 11' which is also in an operative engagement with the spur gear 12 of the steering gear line.

The arrangement of the clutches 3, 3' directly on the end area of the rotor 2 require only that relatively low masses must be driven in the idling operation of the electric motor 1. In addition, the arrangement of the clutches 3, 3' in the input area of the transmission arrangement causing a transmission ratio has the result that the torques to be applied by the respective clutch 3, 3' are relatively low so that the clutches 3, 3' can be constructed of a comparatively small or compact size.

The embodiment of the steering booster system according to the invention illustrated in top view (A) in FIG. 2 and side view (B) in FIG. 2 (in the direction of the arrow b in view (A)) operates without any worm drive and therefore has a comparatively low self-locking. In addition, the ratio by the transmission arrangement without the worm gear is clearly lower so that the arrangement corresponding to FIG. 2 operates more directly and at a higher efficiency.

Figure 3:
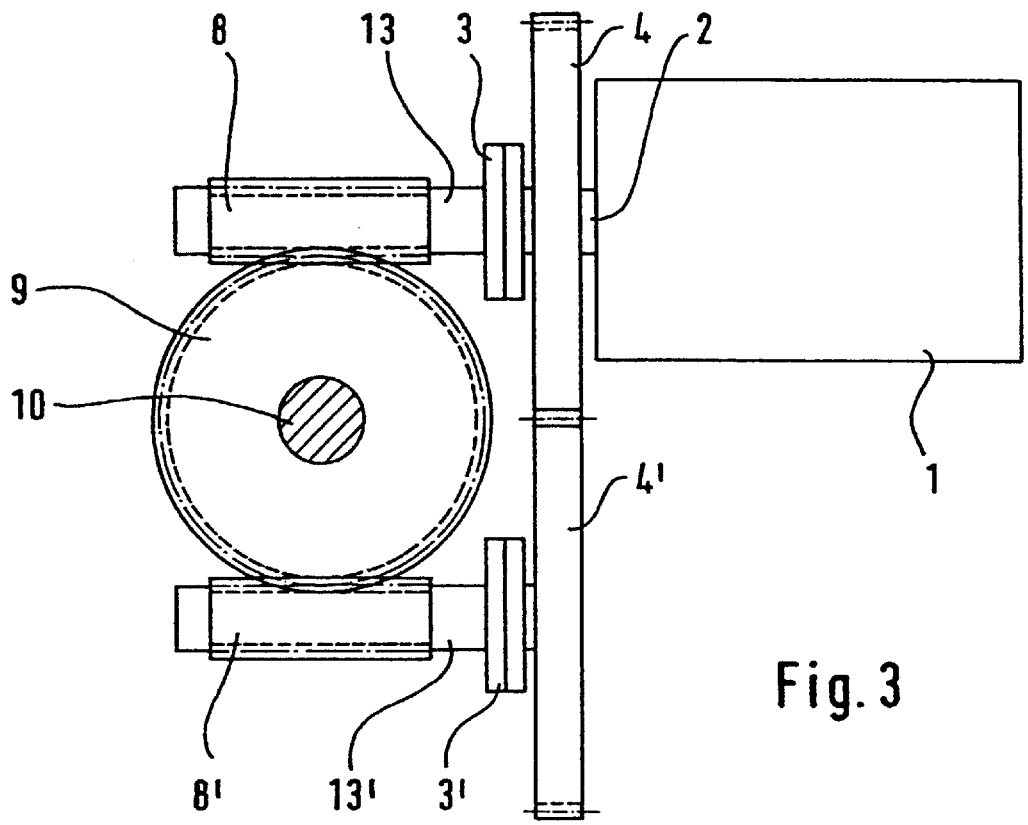
FIG. 3 is a schematic top view of another embodiment of the steering booster system according to the invention in the area of the force transmission to the steering gear line.

In an embodiment corresponding to FIG. 3, the rotor 2 of the electric motor 1 is again non-rotatably connected with a spur gear 4 and with the input area of the clutch 3. The output area of the clutch 3 is non-rotatably connected with a shaft 13 which, in turn, carries a worm pinion 8 in a non-rotatable manner which is in an operative engagement with the worm gear 9 of the pinion shaft 10. While the spur gear 4, the clutch 3, the shaft 13 and the worm pinion 8 are assigned to one rotating direction of the worm gear 9, a correspondingly constructed arrangement consisting of the spur gear 4, the clutch 3', the shaft 13' and the worm pinion 8' is provided for the other rotating direction of the worm gear 9. In this embodiment, the spur gears 4, 4' are in an operative engagement with another, whereby the rotating direction in the input area of the respective clutch 3, 3' and thus of the transmission arrangement is opposite.

Figure 4:
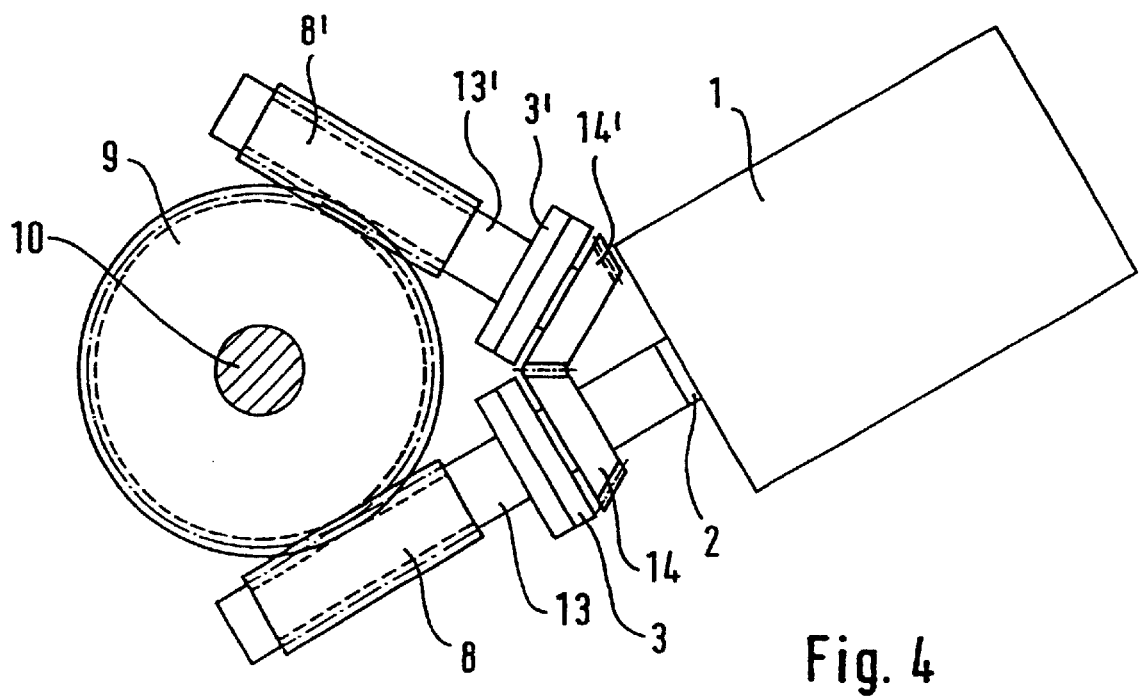
FIG. 4 is a schematic top view of another embodiment of the steering booster system according to the invention in the area of the force transmission to the steering gear line.

An embodiment corresponding to FIG. 4 is constructed for other spatial conditions and instead of having the spur gears 4, 4', has bevel gears 14, 14'. Otherwise, the embodiment corresponding to FIG. 4 is essentially identical to the embodiment corresponding to FIG. 3.

Figure 5:
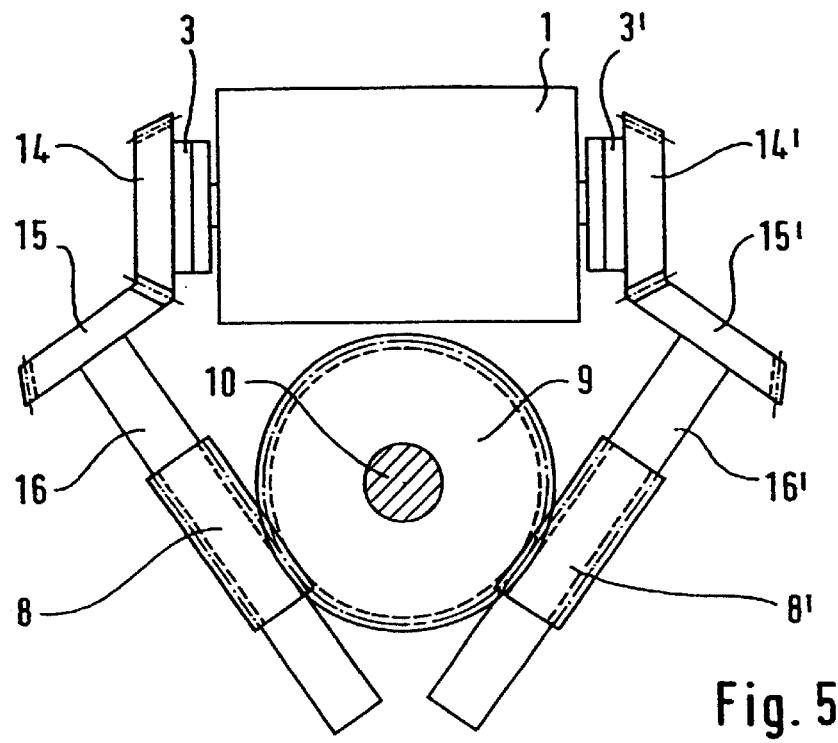
FIG. 5 is a schematic top view of another embodiment of the steering booster system according to the invention in the area of the force transmission to the steering gear line.

In an embodiment corresponding to FIG. 5, one clutch 3, 3' respectively as well as one bevel gear 14, 14' respectively are arranged on the rotor 2 of the electric motor 1 on both sides of the electric motor 1. The input side of the clutch 3, 3' is, in each case, non-rotatably connected with the rotor 2, while the output side of the clutch 3, 3' is non-rotatably connected with the bevel gear 14, 14'. The bevel gear 14, 14' is, for example, again rotatably disposed on the rotor 2.

Each of the bevel gears 14, 14' is in an operative engagement with another bevel gear 15, 15', which is in each case non-rotatably mounted on an axial end of a shaft 16, 16'. Each of these shafts 16, 16' carries in turn, a worm pinion 8, 8' which meshes with the worm gear 9 of the pinion shaft 10. For one rotating direction of the worm gear 9 or of the pinion shaft 10, the clutch 3 transmits the torque of the electric motor 1 by way of the bevel gears 14, 15, the shaft 16 and the worm pinion 8 to the worm gear 9. For the other rotating direction, the clutch 3', by way of the bevel gears 14', 15', the shaft 16' and the worm pinion 8', transmits the steering assistance force to the worm gear 9.

Figure 6:
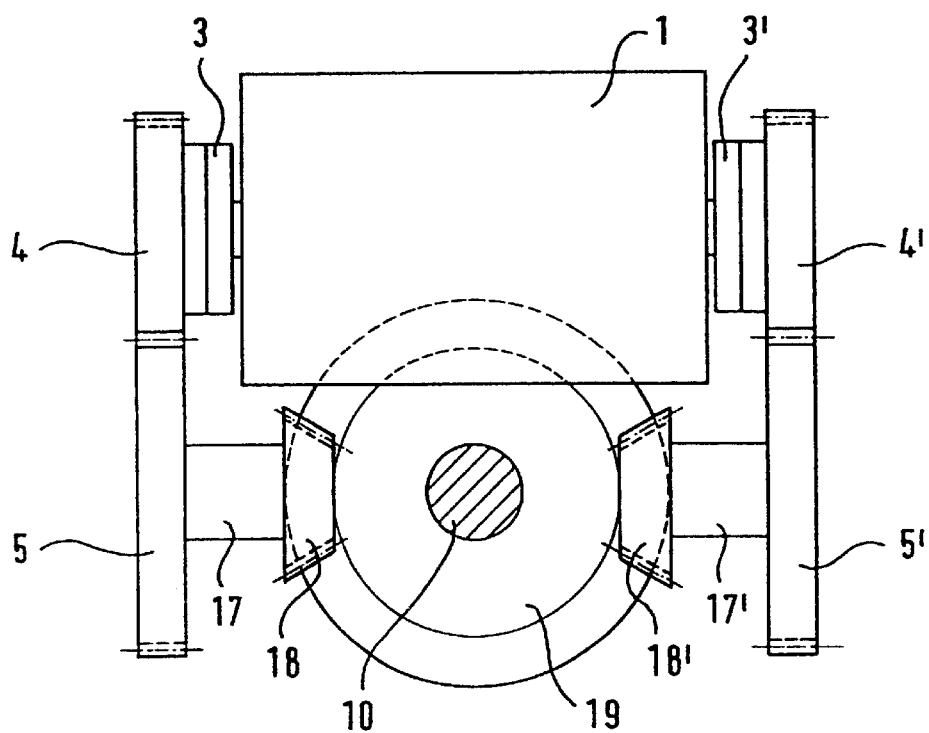
FIG. 6 is a schematic top view of another embodiment of the steering booster system according to the invention in the area of the force transmission to the steering gear line.

In another embodiment of the steering booster system according to the invention corresponding to FIG. 6, one clutch 3, 3' respectively and one spur gear 4, 4' respectively are again arranged on both ends of a shaft of a rotor 2 penetrating the electric motor 1. Also in this embodiment, the clutch input is non-rotatably connected with the rotor 2 and the corresponding clutch output is non-rotatably connected with the spur gear 4 and 4'. Advantageously, the spur gear 4, 4' is rotatably disposed on the shaft of the rotor 2. Each spur gear 4, 4' is in each case in an operative engagement with another spur gear 5, 5'. The spur gears 5, 5' are each non-rotatably arranged on an axial end of a shaft 17, 17'.

The respective opposite axial end of the shaft 17, 17' carries a bevel gear 18 in a non-rotatable manner. The bevel gear 18 is in an operative engagement with a bevel gear 19 which, in turn, is non-rotatably connected with the pinion shaft 10 of the steering gear line. In this embodiment, for example, the left angle of the manual steering wheel is transmitted by the clutch 3 by way of the spur gears 4, 5, the shaft 17 and the bevel gear 18 to the bevel gear 19 or the steering gear line; and a corresponding right angle transmits, by way of the clutch 3', the spur gears 4', 5', the shaft 17' and the bevel gear 18', transmits a force boosting the manual steering force to the bevel gear 19 and to the steering gear line.

The individual embodiments of FIGS. 1 to 6 differ mainly because of the further development of the transmission arrangement between the electric motor 1 and the steering gear line. This further development considerably influences the space requirements for the installation of such a power steering system. In addition, it has an effect on the moments of inertia to be overcome, so that the used clutches 3, 3' can be dimensioned to be correspondingly larger or smaller.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering booster system for a motor vehicle, comprising a transmission arrangement having an electric motor, an electronic control unit configured to sense an amount and direction of forces and torques appliable by a driver to a manual steering wheel and correspondingly to control a steering-force-assisting connection of an electric motor into a steering gear line coupleable to the manual steering wheel and steered vehicle wheels, an electrically switchable clutch for each steering direction, each clutch being arranged such that a first rotation direction at an input of the transmission arrangement associatable with the electric motor produces a second rotation direction at an output of the transmission arrangement associatable with the steering gear line, with the electronic control unit configured to control the steering force assistance by way at least one of a slip of the respective clutch and the torque of the electric motor, and at least one worm drive operatively connected with the electric motor via each clutch arranged at opposite ends of the electric motor.

2. Steering booster system according to claim 1, wherein each clutch is arranged to interact with a rotor extending from the opposite sides of the electric motor.

3. Steering booster system according to claim 1, wherein each clutch is arranged in an input area of the transmission arrangement assigned to the electric motor.

4. Steering booster system according to claim 1, wherein each clutch is an eddy current clutch.

5. Steering booster system according to claim 4, wherein each eddy current clutch is operatively associatable with an eddy current measured value generator which senses force or torque.

6. Steering booster system for a motor vehicle, comprising a transmission arrangement having an electric motor, an electronic control unit configured to sense an amount and direction of forces and torques appliable by a driver to a manual steering wheel and correspondingly to control a steering-force-assisting connection of an electric motor into a steering gear line coupleable to the manual steering wheel and steered vehicle wheels, an electrically switchable clutch for each steering direction, each clutch being arranged such that a first rotation direction at an input of the transmission arrangement associatable with the electric motor produces a second rotation direction at an output of the transmission arrangement associatable with the steering gear line, with the electronic control unit configured to control the steering force assistance by way at least one of a slip of the respective clutch and the torque of the electric motor, and a worm drive operatively connected with each clutch, wherein each clutch is arranged at sides of the electric motor and are operatively associated with a rotor of the electric motor between the rotor and a spur gear, a worm gear of the worm drive is coupleable with a steering gear line, and a worm pinion of the worm drive meshing with the worm gear is disposed on a shaft which has one spur gear respectively at ends thereof, the spur gear assigned to one clutch drives the shaft directly on an associated spur gear, and the spur gear assigned to another clutch drives the shaft indirectly by way of an intermediately connected additional spur gear on the other spur gear of the shaft.

* * * * *